Oct. 11, 1938.                      C. F. MORAIN                      2,133,035
                             PIPE LINING OR COATING MEANS
                              Filed Oct. 28, 1936         4 Sheets-Sheet 1
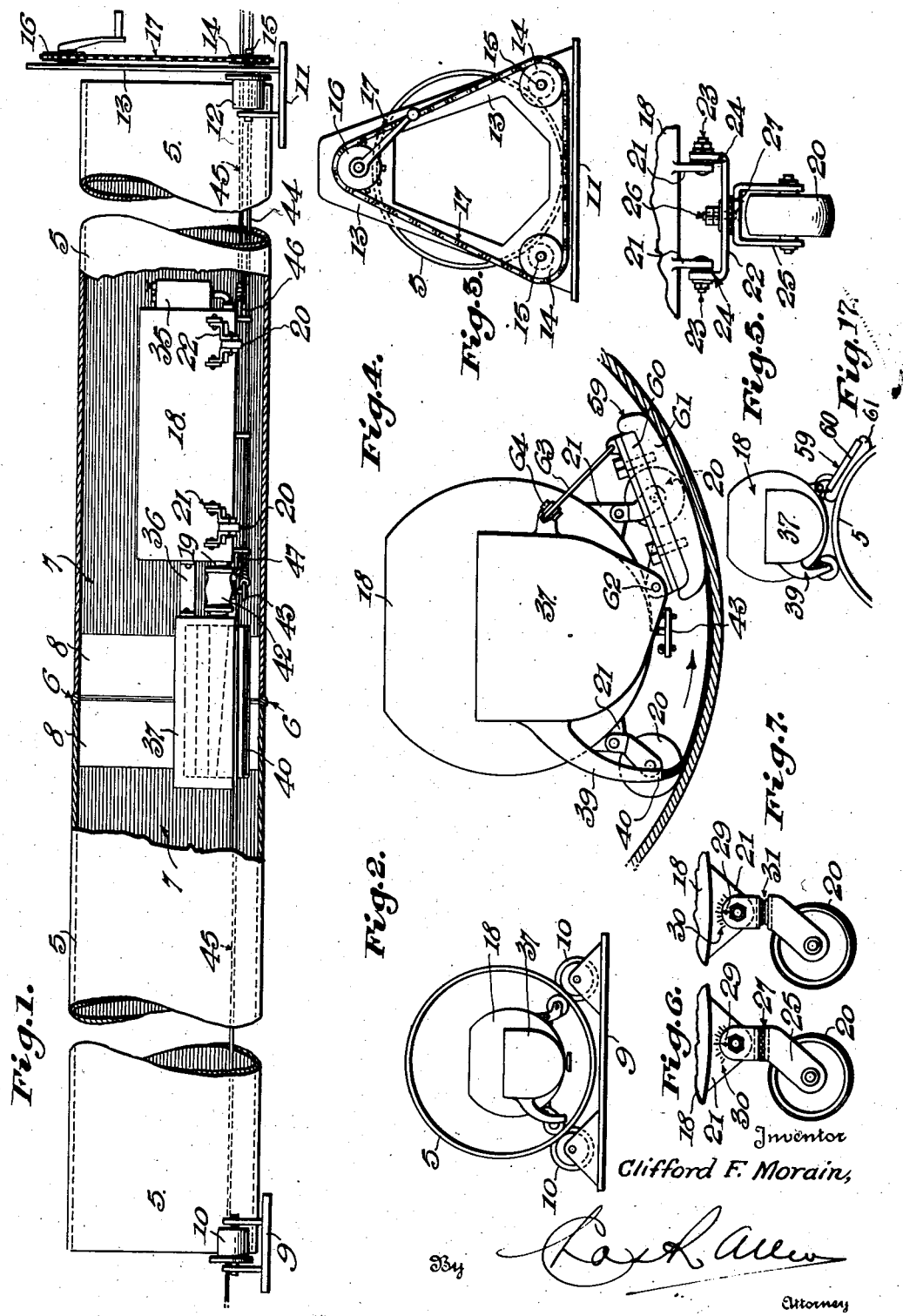
Inventor
Clifford F. Morain,
By
Attorney Oct. 11, 1938.  C. F. MORAIN  2,133,035
PIPE LINING OR COATING MEANS
Filed Oct. 28, 1936   4 Sheets-Sheet 2
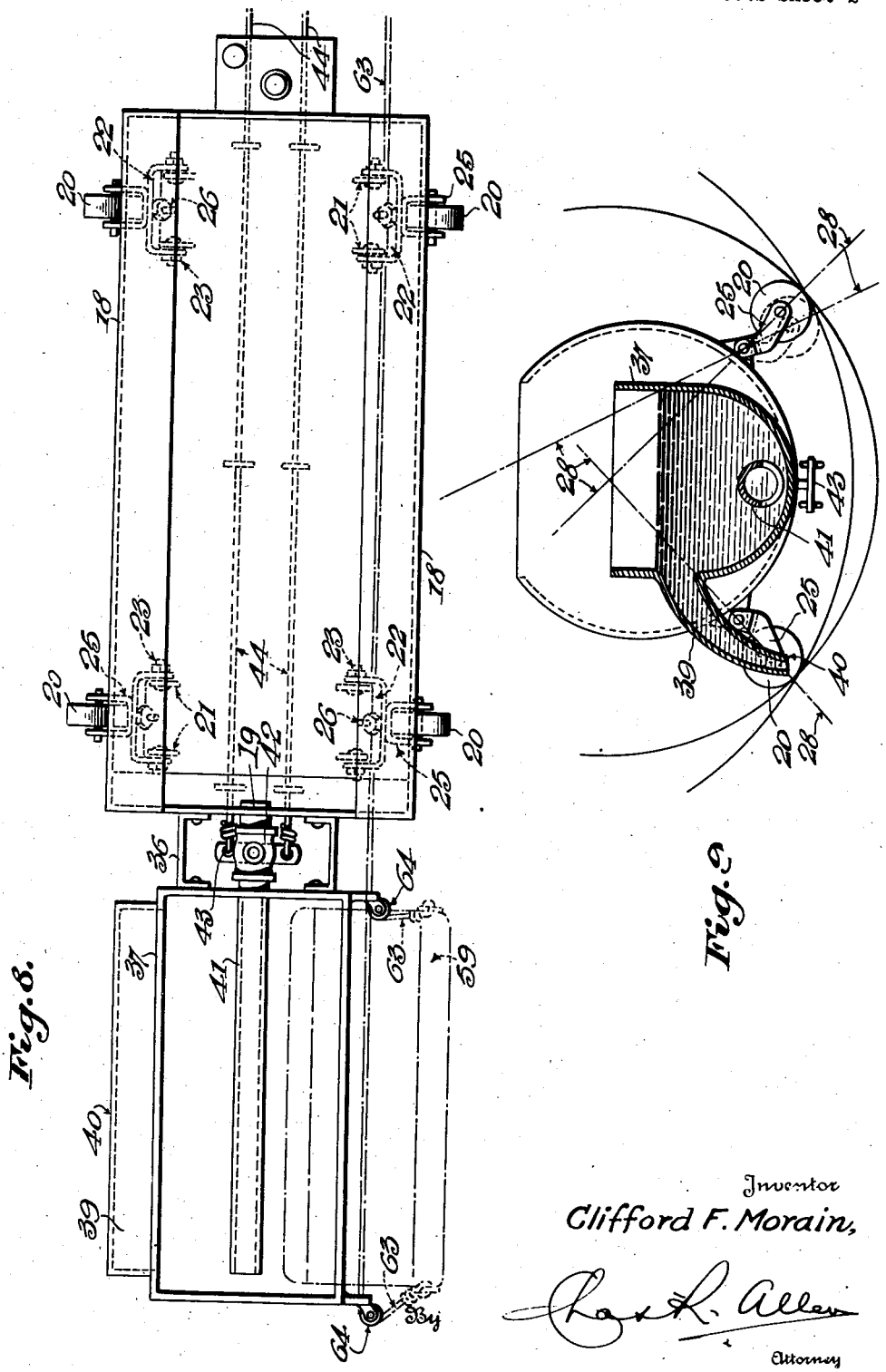
Inventor
Clifford F. Morain,
By
Attorney

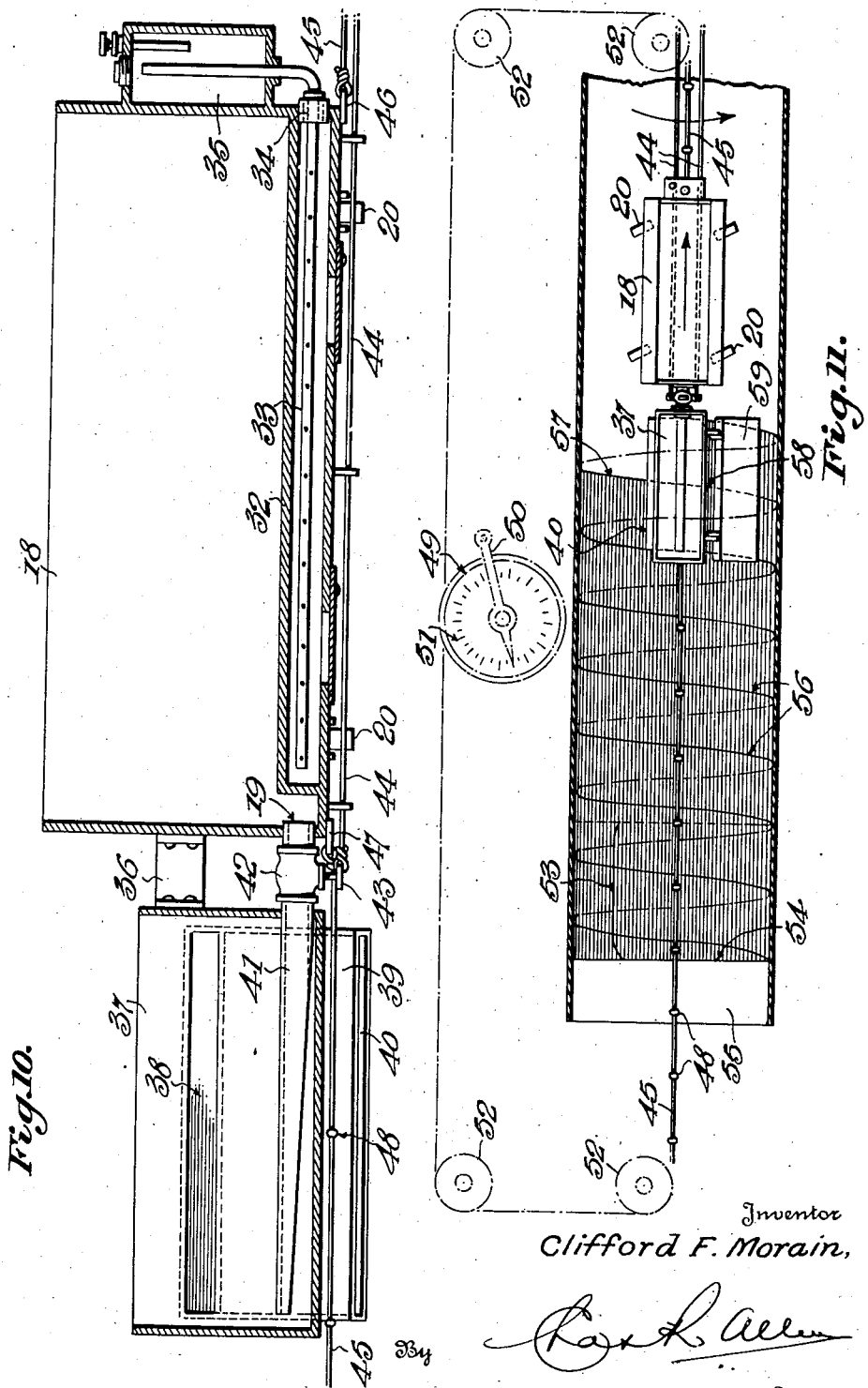

Oct. 11, 1938.  C. F. MORAIN  2,133,035
PIPE LINING OR COATING MEANS
Filed Oct. 28, 1936  4 Sheets—Sheet 4
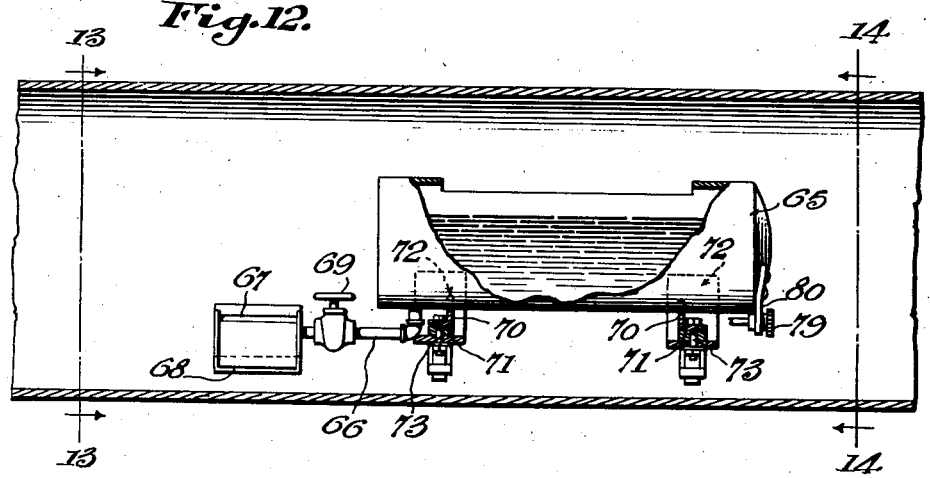
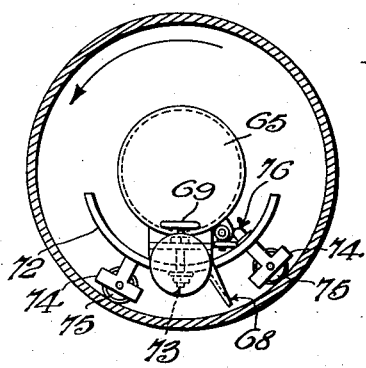
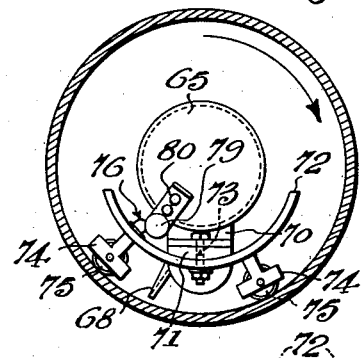
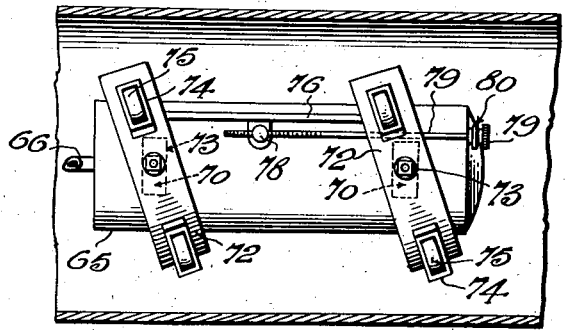
Inventor
Clifford F. Morain,
By [signature]
Attorney Patented Oct. 11, 1938

2,133,035

UNITED STATES PATENT OFFICE 2,133,035

PIPE LINING OR COATING MEANS

Clifford F. Morain, Youngstown, Ohio, assignor to The General Paint Corporation, San Francisco, Calif., a corporation of Nevada Application October 28, 1936, Serial No. 108,106

17 Claims. (Cl. 91—30)

This invention relates generally to means for coating pipes, either exteriorly or interiorly, for the purposes of protection, enhancement of appearance, or the facilitation of fluid flow, and primarily seeks to provide new and improved apparatus for applying the coating material.

It is well known that pipes and tubing formed of known materials are subject to rust and corrosion, and that piping adapted for water conduits, either steel, cast iron or concrete, when used without suitable internal pre-treatment, is subject to the formation of tubercles. Tuberculation is no small factor to be considered by engineers in constructing water lines. Records are available which show that the supply of water to a city can be reduced as much as 10% by reason of the constriction of the internal diameter of the conduit by tubercle formation. While my improved apparatus is adapted to more general application, or in other words to all general forms of coating, both internal and external, to which pipes are subjected, it is designed principally for coating pipes in the field, where they are being laid.

According to one popular practice of pipe coating the interiors of the pipes are given a heavy coating of bituminous enamel which is applied hot and ultimately forms a very smooth lining such as will definitely prevent tuberculation and reduce to a minimum frictional resistance to fluid flow. This lining terminates short of the ends of the pipes so as to leave annular bare spaces to facilitate assembly coupling of the pipes by welding or other suitable couplings.

One of the objects of the invention therefore is to provide a novel apparatus which can be moved into coupled pipe sections and utilized for coating the surfaces left bare in order to facilitate the coupling of said sections.

Another object of the invention is to provide in an apparatus of the character stated, means for determining the position of the coating material applying devices and for controlling the operation of said devices from without the pipes.

Another object of the invention is to provide, in an apparatus of the character stated, novel rollers for supporting the apparatus while effecting the coating operation and which are adjustable to permit the apparatus to remain stationary while the pipe revolves, to permit the apparatus to be drawn along the pipe surface, to cause the apparatus to move along the pipe surface due to the rotation of the pipe and the angularity of the rollers, to adapt the apparatus to the coating of pipes of various diameters, and to permit the apparatus to be used either internally or externally of the pipe.

Another object of the invention is to provide, in an apparatus of the character described, an ironing device for applying pressure to the coating as it is laid to thereby smooth the coating and press out air bubbles such as would result in surface imperfections, also novel means for mounting said ironing device whereby it may be removed from contact with the pipe surface whenever desired.

With these and other objects in view that will hereinafter appear, the invention further resides in the novel details of construction, combination and arrangement of parts all of which will be first fully described in the following detailed description, then be particularly pointed out in the appended claims, reference being had to the accompanying drawings.

In the drawings:

Figure 1 is a somewhat diagrammatic side elevation illustrating my invention applied to the coating of portions of the interior of coupled pipe sections, parts being in longitudinal section.

Figure 2 is a left end view.

Figure 3 is a right end elevation.

Figure 4 is an enlarged left end elevation of the coating apparatus with an ironing device applied thereto, a portion of the pipe being coated being illustrated in cross section.

Figure 5 is an enlarged detail side elevation of one of the mounting rollers.

Figure 6 is a detail end view of the roller shown in Figure 5.

Figure 7 is a view similar to Figure 6 illustrating a caster form of roller.

Figure 8 is a detail plan view of the coating apparatus shown in Figure 1, an ironing device being shown applied thereto in dot and dash lines.

Figure 9 is a somewhat diagrammatic vertical cross section taken through the coating applicator and illustrates the feature of adjusting the rollers to different sizes of pipes.

Figure 10 is a central longitudinal section of the apparatus shown in Figure 8.

Figure 11 is a diagrammatic plan view illustrating the apparatus in use for coating the interior of a pipe, the piping being shown in horizontal section.

Figure 12 is a vertical longitudinal section of a pipe section with a modified form of my apparatus mounted therein.

Figure 13 is a vertical cross section taken on the line 13—13 on Figure 12.

Figure 14 is a vertical cross section taken on the line 14—14 on Figure 12.

Figure 15 is an inverted plan view of the truck portion of my device and illustrates the adjustment of the supporting roller equipment.

Figure 16 is a diagrammatic inverted plan view illustrating the adjustment of the supporting rollers.

Figure 17 is a diagrammatic fragmentary end view showing the coating apparatus applied to the coating of the exterior of a pipe section.

Like reference numerals designate corresponding parts throughout the several figures of the drawings.

In Figure 1 of the drawings, I have illustrated my apparatus as adapted to use in the field for coating pipes as they are laid. According to one popular method of pipe coating the pipes are coated upon a suitable machine before they are shipped to the place of use, an annular bare space being left at each end of the pipe so as to facilitate assembly coupling of pipe sections by welding or otherwise.

In Figure 1 a pair of pipe sections 5, 5 are shown joined by a weld joint 6, the pre-coated portions of the pipe being indicated at 7 and the annular bare spaces at 8. It is a purpose of my invention to provide a simple apparatus which can be inserted into the pipe sections and moved to the position shown in Figure 1 so as to coat the bare spaces 8 as the sections are assembled as shown.

My apparatus comprises a cradle 9 supporting a pair of spaced idler rollers 10 upon which one end of the assembled pipe sections is mounted as illustrated in Figure 1. A similar cradle 11 supports the other end of the assembled sections and is equipped with supporting and driving rollers 12 and an upstanding frame portion, 13. A pair of sprockets 14 are mounted upon stub shafts 15 secured to and extending from the driving rollers 12 and a single driving sprocket 16 is rotatably supported at the upper portion of the frame 13. The driving sprocket 16 has fixed thereto a crank, and a chain 17 passes about the sprockets 14 and 16 so that when the sprocket 16 is rotated by manipulation of the crank the rotation will be imparted to the sprockets 14, the rollers 12 and the pipe sections 5 supported thereon.

For suitably applying the coating to the bare spaces 8 within the pipe sections, or, if desired, to the whole of the interior or the exterior of the pipe sections I provide a novel coating apparatus which is disclosed in detail in Figures 2 to 10 of the drawings. This apparatus includes a truck 18 which is in the nature of a trough-like container having an open top and an outlet 19 and being supported upon rollers 20 preferably rubber tired so as to avoid scraping of the primed surface of the pipe sections.

Mounting ears 21 project from the truck body as illustrated in Figures 4, 5 and 8 of the drawings, and U-shaped mounting brackets 22 are provided, the legs thereof being adjustably secured to said ears as indicated at 23. In order definitely to secure the adjustment, the opposing surfaces of each bracket and the associated ears are corrugated or notched as at 24. The rollers are rotatably supported in stirrups 25 which are pivotally supported as at 26 to the brackets 22, the opposed stirrup end bracket faces being similarly corrugated or notched as at 27 to assure against slippage.

By reason of the provision of the novel roller mounting above described, it is possible to adjust the angular relation of the rollers to the axis of the pipe so that upon rotation of the pipe the truck will remain stationary while the pipe revolves, or, if the rollers are positioned on an angle as illustrated in Figure 11 of the drawings, move along in the pipe as the latter is rotated. It is also possible to adjust the rollers about the pivotal connection 23 as illustrated in Figure 9 of the drawings so as to adapt the truck to use in pipes of various sizes. By this means the rollers can be adjusted so that an imaginary radial of a pipe, indicated at 28 in Figure 9, of given diameter will always pass through both the roller axis and the pivots 23 thus assuring a proper contact of the rollers with the pipe surface regardless of the diameter thereof. By this means also it is possible to so adjust the rollers as to adapt the apparatus for coating the interior or the exterior of pipe sections. See Figures 2 and 17.

If desired one or both legs of the roller mounting bracket 22 may be provided with a pointer or arrow as indicated at 29 for association with a suitable scale marking 30 provided on the associated ear or ears 21 as indicated in Figures 6 and 7 and by which means the proper adjustment of the rollers according to the pipe diameter being worked may be determined.

Instead of being equipped with adjustment securing notches 27 the pivotal connection 26 between the brackets 22 and stirrups 25 may be in the nature of a free caster pivot equipped with ball bearings as indicated at 31 in Figure 7. When thus equipped the rollers are free to follow in any direction dictated by the relative movement between the coating apparatus and the pipe section or sections within which it is operating.

At the bottom the truck 18 is equipped with a heat tunnel 32 by which heat may be indirectly applied to the bituminous enamel coating with which I prefer to coat the pipe sections. It is desirable that this coating material be kept at a temperature approximating 400° during the coating operation. For this purpose a burner 33 or other heat producing element is mounted in the tunnel. This element may take any particular form but in this disclosure I have generally indicated a liquid fuel burner which is removably supported at 34 in the tunnel and may be supplied with gasoline or other liquid fuel from the supply tank 35 attached to the truck as illustrated in Figures 8 and 10 of the drawings.

Supported upon the truck in any suitable manner as at 36 and longitudinally alined therewith, is a coating applicator generally designated 37 and which is in the form of an open trough-like body having an overflow opening 38 leading into a discharge spout 39 which terminates adjacent the surface to-be-coated in a ribbon laying lip 40. The applicator is connected by a flow pipe 41 with the outlet from the truck 18 and in this pipe is mounted a control valve 42.

The control valve is equipped with a cross bar handle 43 to which cords 44 are attached and which lead out of the pipe section or sections being-coated to enable the controlling of the valve and thereby the flow of coating from a remote point.

Pull cords 45 are attached to the respective ends of the truck 18, one being attached as at 46 at one end of the truck and the other at 47 at the other end of the truck. By means of the pull cords it is possible to impart movement to the coating apparatus within the pipe sections and these cords may be equipped with equidistantly spaced indicators generally designated 48 and by the position of which, with relation to the end of the pipe, or some other suitable marking medium, it is possible to accurately determine the position of the applicator within the pipe sections.

If desired the cords 45 may comprise the respective ends of a single pull cord medium which is wound about a windlass 49 having a rotating crank 50 and suitable scale markings 51 by which it is possible to determine the amount of movement imparted to the pull cord by turning of the windlass. The cord may be suitably passed over idler or guide pulleys 52 as is illustrated diagrammatically in Figure 11 of the drawings. By employment of this means, it is possible not only to accurately determine the position of the applicator within the pipe sections but it is also possible to impart to the applicator a controlled or measured travel longitudinally in the pipe so as to lay therein a spiral shingled ribbon in accordance with the method disclosed in the application of David W. Boylan, filed October 28, 1936, Serial No. 108,105. In this use of the invention it will be desirable to employ rollers of the caster type such as are disclosed in Figure 7 of the drawings.

When it is desired to coat the whole of the interior of the pipe, as distinguished from coating only the bare spaces 8, it is possible to hold the applicator in one position during one or more revolutions of the pipe so as to provide a transverse annular ribbon indicated at 53 and when this ribbon is formed inwardly of the end of the pipe the desired transverse cut off 54 will be provided leaving a bare space 55 similar to those disclosed at 8 in Figure 1. After completion of the transverse ribbon or stripe 53 the applicator may be moved longitudinally within the rotating pipe so as to lay a helical ribbon, the individual helices being so pitched as to overlap or shingle as at 56 with the ribbon centered on the terminal edge 57 of each previously laid helix as indicated at 58. See Figure 11. Thus I have disclosed herein one means which may be employed for practicing the method disclosed in the David W. Boylan application referred to above.

When working with hot bituminous enamel it is desirable to iron or apply pressure to the coated surface so as to smooth the same and remove therefrom all air bubbles such as might tend to provide surface imperfections. For this purpose an ironer generally designated 59 may be employed. See Figures 2, 4, 8, 11 and 17. This ironer may comprise a carrier 60 and a shoe 61 removably secured thereto thus adapting the ironer for contact with the interior or exterior of pipe sections as illustrated in Figures 2, 4 and 16 of the drawings. The ironer may be pivotally secured as at 62 to the applicator 37 and suitable lift cords 63 may be provided, being attached to the carrier 60 and passing over pulleys 64 secured to the applicator 37 and thence out of the end of the pipe where they may be manipulated to lift the ironer off the coated surface or lower the same onto said surface whenever desired.

In Figures 12 to 16, I have disclosed a simple modified form of my apparatus in which the open top tank truck 65 is connected by a pipe line 66 with the applicator equipped with overflow throatway 67 and ribbon laying lip 68 generally equivalent to those hereinbefore described, a suitable valve 69 being provided in the pipe line so as to control the flow of coating material into and from the applicator.

Short frame angles 70 are secured transversely beneath the truck body and are opposed by blocks 71 and attached curved supporting plates 72, the blocks and plates being pivotally secured as at 73 to said angles. See Figures 12, 14 and 15.

Each plate 72 has secured thereto a pair of radially disposed roller brackets 74 each carrying a wheel or roller 75. The plates may be connected in parallel relation by a link 76 pivotally connected at its ends at 77 to said plates and being provided intermediate its ends with a pivotally mounted threaded sleeve 78. A captive screw 79 is operable in the sleeve 78 and is rotatably supported in a lug 80 attached to the truck 65 as illustrated in Figures 12 and 15 of the drawings.

By manipulation of the captive screw 79 it is possible to vary the angularity of the pairs of rollers carried by the respective plates 72 in the manner diagrammatically illustrated in Figure 16 of the drawings. By this means it is possible to control the amount of longitudinal movement which will be imparted to the coating apparatus during each revolution of the pipe within which or upon which the same is mounted.

By provision of my improved apparatus it is possible to efficiently coat piping in the field, or at the location at which the pipes are to be laid, internally or externally, throughout the whole length of the pipe, as described in the David W. Boylan application herein referred to, and as illustrated in Figure 11 of the drawings, or only over small areas of the pipes as illustrated in Figure 1 of the drawings.

It is of course to be understood that the details of structure and arrangement of parts may be variously changed and modified without departing from the spirit and scope of my invention.

I claim:

1. In pipe coating apparatus, a mobile coating applicator receivable within the pipe including a coating material carrying housing of a capacity for carrying enough coating material for coating a number of pipes and from which coating material flows for coating interior portions thereof, means by which the applicator can be moved longitudinally in the pipe, and means associated with said last named means for indicating externally the position of the applicator within the pipe.

2. In pipe coating apparatus, a mobile coating applicator receivable within the pipe including a coating material carrying housing of a capacity for carrying enough coating material for coating a number of pipes and from which coating material flows for coating interior portions thereof, and means for moving the applicator longitudinally in the pipe and for indicating externally the position of the applicator within the pipe.

3. In pipe coating apparatus, the combination of a truck for containing the coating material, an applicator supported by and fed with coating material from the truck, wheels supporting the truck, and means by which the wheels may be adjusted to ride upon either the internal or the external surface of the pipe to be coated.

4. In pipe coating apparatus, the combination of a truck for containing the coating material, an applicator supported by and fed with coating material from the truck, wheels supporting the truck, means to adjust the angularity of the wheels, and means to adjust the wheels to adapt the apparatus for inside or outside coating.

5. In pipe coating apparatus, the combination of a truck for containing the coating material, an applicator supported by and fed with coating material from the truck, wheels supporting the truck, brackets in which the wheels are rotatably mounted, means for adjustably pivoting said brackets to said truck whereby the wheels can be adjusted in position with the wheel axis and the pivot center of each wheel unit lying in a radial of the pipe being coated regardless of the size of said pipe, and means for indicating the degree to which adjustment should be made for a given size of pipe.

6. In a pipe coating apparatus, the combination of a truck for containing the coating material, an applicator supported by and fed with coating material from the truck, and wheel units supporting the truck, each said unit comprising a pair of mounting ears projecting from the truck, a U-shaped bracket adjustably pivoted to said ears, a wheel, and a stirrup rotatably supporting the wheel and adjustably pivoted to said bracket.

7. In a pipe coating apparatus, the combination of a truck for containing the coating material, an applicator supported by and fed with coating material from the truck, and wheel units supporting the truck, each said unit comprising a pair of mounting ears projecting from the truck, a U-shaped bracket adjustably pivoted to said ears, a wheel, and a stirrup rotatably supporting the wheel and adjustably pivoted to said bracket, the axis of said bracket connection with the truck ears being disposed horizontally, and the axis of said connection between the bracket and stirrup being disposed transversely with respect to the axis of the bracket connection.

8. In a pipe coating apparatus, the combination of a truck for containing the coating material, an applicator supported by and fed with coating material from the truck, and wheel units supporting the truck, each said unit comprising a pair of mounting ears projecting from the truck, a U-shaped bracket adjustably pivoted to said ears, a wheel, and a stirrup rotatably supporting the wheel and adjustably pivoted to said bracket, the opposing surfaces of said bracket and ears and of said bracket and stirrup being irregular to prevent slippage of the adjustment.

9. In a pipe coating apparatus, the combination of a truck for containing the coating material, an applicator supported by and fed with coating material from the truck, and wheel units supporting the truck, each said unit comprising a pair of mounting ears projecting from the truck, a U-shaped bracket adjustably pivoted to said ears, a wheel, and a stirrup rotatably supporting the wheel and connected to said bracket, and indicating means carried respectively by certain engaging ear and bracket portions for indicating the angular relations of said portions.

10. In a pipe coating apparatus, the combination of a truck for containing the coating material, an applicator supported by and fed with coating material from the truck, a pair of supporting members disposed transversely in spaced relation beneath the truck and pivotally connected thereto, supporting wheels carried by each said member, and means for simultaneously moving said members to vary the angularity of said wheels.

11. In a pipe coating apparatus, the combination of a truck for containing the coating material, an applicator supported by and fed with coating material from the truck, a pair of supporting members disposed transversely in spaced relation beneath the truck and pivotally connected thereto, supporting wheels carried by each said member, and means for simultaneously moving said members while retaining their parallel relation to vary the angularity of said wheels.

12. In a pipe coating apparatus, the combination of a truck for containing the coating material, an applicator supported by and fed with coating material from the truck, a pair of arcuate supporting members disposed transversely in spaced relation beneath the truck, and a pair of wheels carried by each said member, the wheels of each pair being spaced unequal distance from the center of the member by which they are carried for stabilizing the apparatus during rotation of a pipe being coated.

13. In a pipe coating apparatus, the combination of a truck for containing the coating material, an applicator supported by and fed with coating material from the truck, a pair of supporting members disposed transversely in spaced relation beneath the truck and pivotally connected thereto, supporting wheels carried by each said member, a link pivotally connected at its ends to the transverse members to hold them in parallel relation, and means to move the link to vary the angularity of the wheels.

14. In a pipe coating apparatus, the combination of a cylindrical truck body for containing the coating material, an applicator supported by and fed with coating material from the truck, a pair of arcuate supporting members concentrically spaced from and pivotally supported in parallel spaced relation beneath the truck body, supporting wheels carried by each said member, and means for simultaneously moving said members while retaining their parallel relation to vary the angularity of said wheels.

15. In a pipe coating apparatus for interiorly coating pipes, the combination of a truck for containing the coating material and movable along interior surfaces of pipes, an applicator supported by and fed with coating material from the truck, anti-friction supporting means for rendering the apparatus mobile over pipe surfaces to be coated, an ironer supported by the apparatus for smoothing the coated surface and pressing out air bubbles therefrom, and means whereby the ironer can be applied to or removed from the coated surface at will while the apparatus is moving along in a pipe.

16. In pipe coating apparatus, coating material applicating means mobile within the pipe, a coating ironing device supported by said means, and means operable from without the pipe for presenting the ironer to or removing it from the coated surface at will.

17. In pipe coating apparatus, a truck mobile within the pipe and containing coating material, an applicator supported by and fed with coating material from the truck, valve controlled means for controlling the applicaton of the coating material, means for controlling the valve from without the pipe, a coating ironing device supported by the apparatus, and means operable from without the pipe for presenting the ironer to or removing it from the coated surface at will.

CLIFFORD F. MORAIN.